(12) United States Patent
Choi et al.

(10) Patent No.: US 12,296,890 B2
(45) Date of Patent: May 13, 2025

(54) COWL STRUCTURE OF VEHICLE

(71) Applicants: Hyundai Motor Company, Seoul (KR); Kia Corporation, Seoul (KR)

(72) Inventors: Sun Ki Choi, Hwaseong-si (KR); Cheol Han Park, Suwon-si (KR); Ji Won Chang, Seoul (KR); Jae Wan Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 345 days.

(21) Appl. No.: 17/955,804

(22) Filed: Sep. 29, 2022

(65) Prior Publication Data

US 2023/0119880 A1    Apr. 20, 2023

(30) Foreign Application Priority Data

Oct. 20, 2021  (KR) .......................... 10-2021-0140020

(51) Int. Cl.
*B62D 25/08*     (2006.01)
(52) U.S. Cl.
CPC .................................. *B62D 25/081* (2013.01)
(58) Field of Classification Search
CPC .. B62D 25/081; B62D 27/02; B60Y 2304/05; B60Y 2306/01; B60Y 2306/09; B60Y 2410/124
See application file for complete search history.

(56) References Cited

U.S. PATENT DOCUMENTS

| 4,718,713 A | 1/1988 | Sakamoto et al. |
| 9,415,807 B2 | 8/2016 | Ichikawa et al. |

FOREIGN PATENT DOCUMENTS

| JP | H09202265 A | 8/1997 |
| JP | 2000313356 A | 11/2000 |
| JP | 3711930 B2 * | 8/2005 |
| JP | 2009126480 A | 6/2009 |
| KR | 100906578 B1 | 7/2009 |
| KR | 20210030125 A | 3/2021 |

OTHER PUBLICATIONS

English Translation of JP3711930B2 (Year: 2005).*
KR 19980038475A with English Translation (Year: 1998).*

* cited by examiner

*Primary Examiner* — Lori Lyjak
(74) *Attorney, Agent, or Firm* — Slater Matsil, LLP (57) ABSTRACT

An embodiment cowl structure of a vehicle includes a first cowl top panel formed in a bent structure to define a top space portion having an open rear surface, an upper portion of the first cowl top panel being coupled to and supporting a lower portion of a windshield glass, and a second cowl top panel coupled to the first cowl top panel and closing the open rear surface of the top space portion.

21 Claims, 6 Drawing Sheets

(Prior Art)

Fig. 7

(Prior Art)

COWL STRUCTURE OF VEHICLE

CROSS-REFERENCE TO RELATED APPLICATIONS

This application claims the benefit of Korean Patent Application No. 10-2021-0140020, filed on Oct. 20, 2021, which application is hereby incorporated herein by reference.

TECHNICAL FIELD

The present disclosure relates to a cowl structure of a vehicle.

BACKGROUND

Generally, a cowl configured to support a lower portion of windshield glass is provided in a front portion of a vehicle. The cowl is disposed in a lower side of the windshield glass and is elongated in a transverse direction of the vehicle body.

Figure 7:
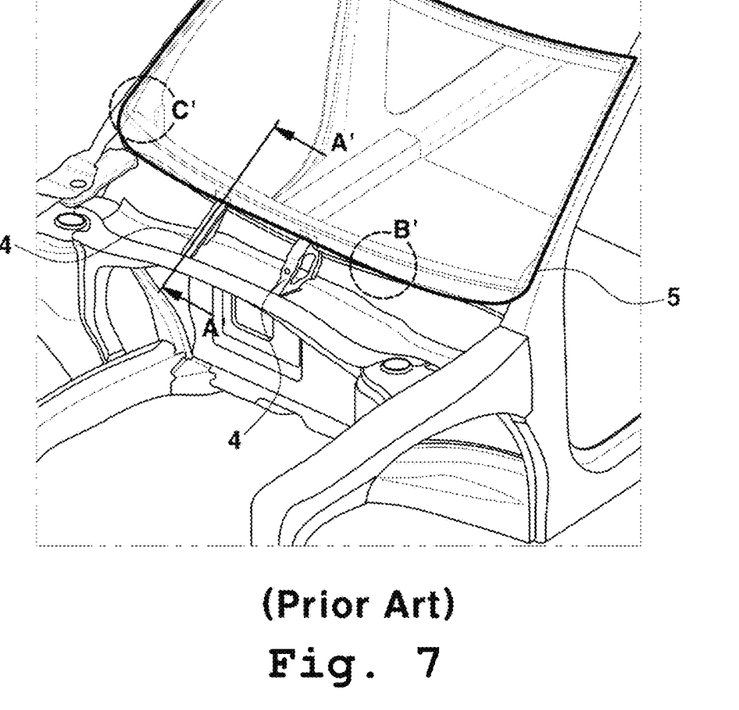
FIG. 7 illustrates a structure of the front vehicle body to which a conventional cowl structure is applied.
Figure 8:
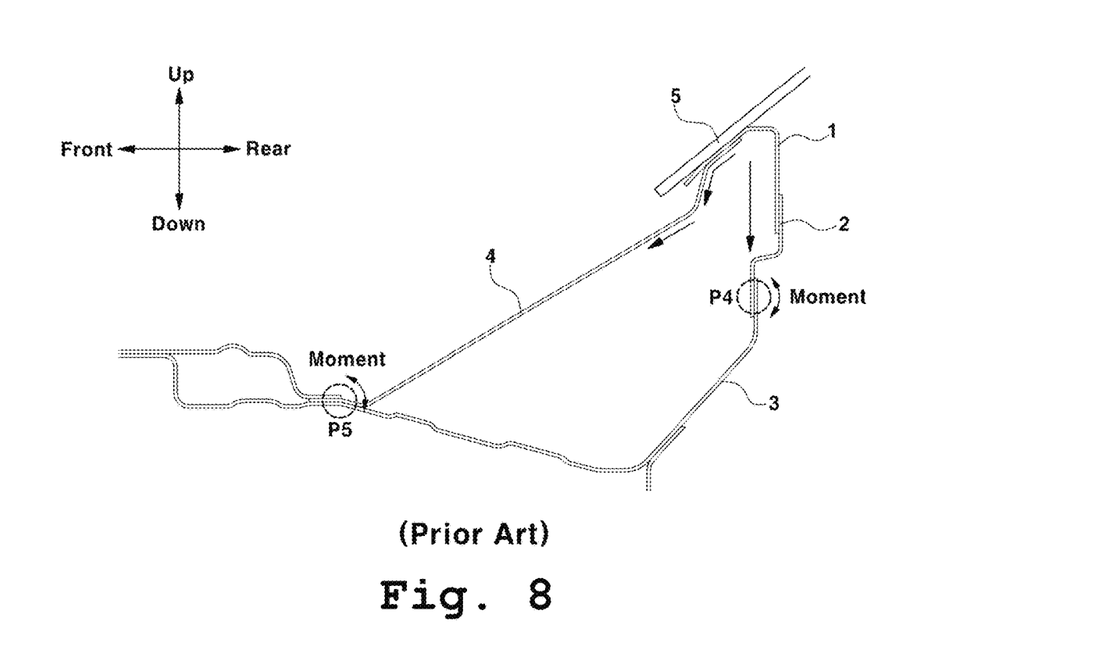
FIG. 8 is a cross-sectional view of FIG. 7 viewed at line A'-A'.
Figure 9:
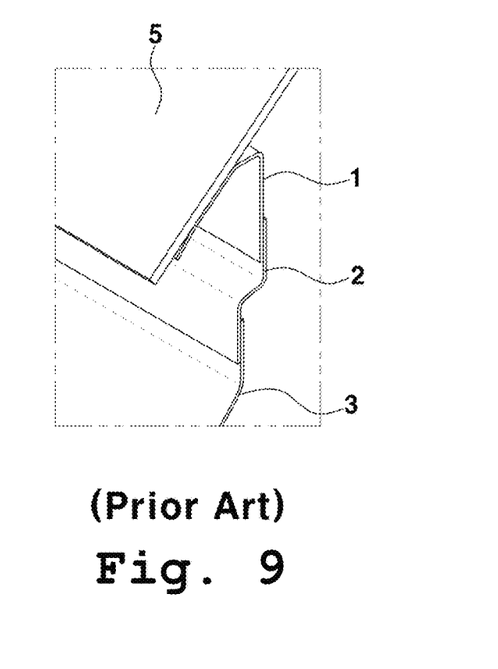
FIG. 9 is a broken perspective view illustrating the B' section of FIG. 7.
Figure 10:
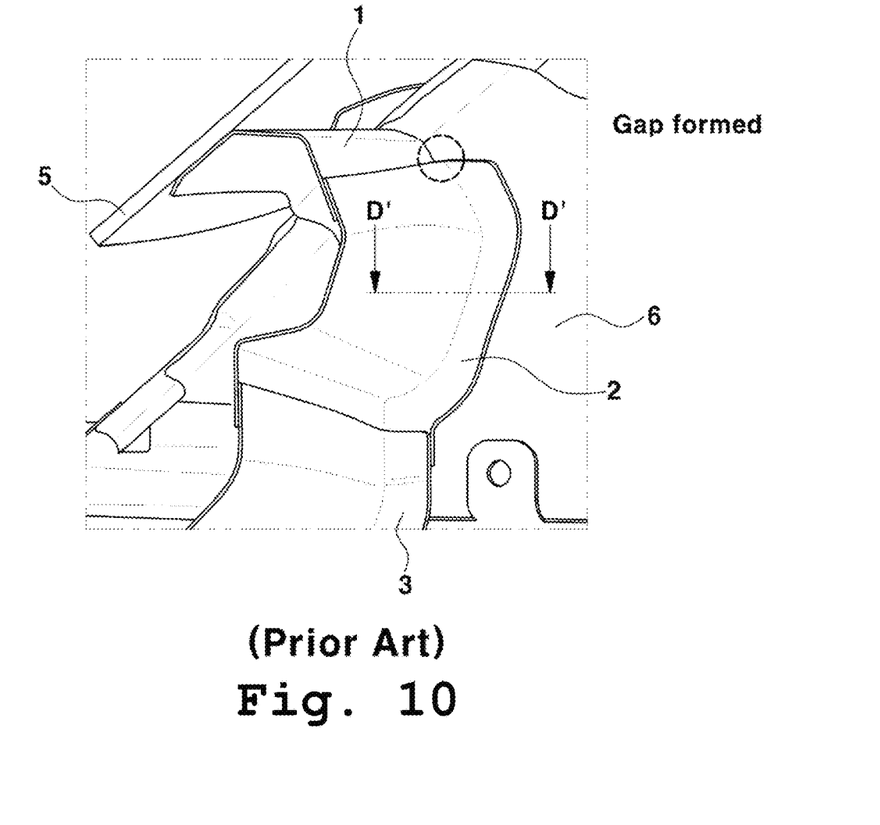
FIG. 10 is a broken perspective view illustrating the C' section of FIG. 7 viewed at the inside of the vehicle body.
Figure 11:
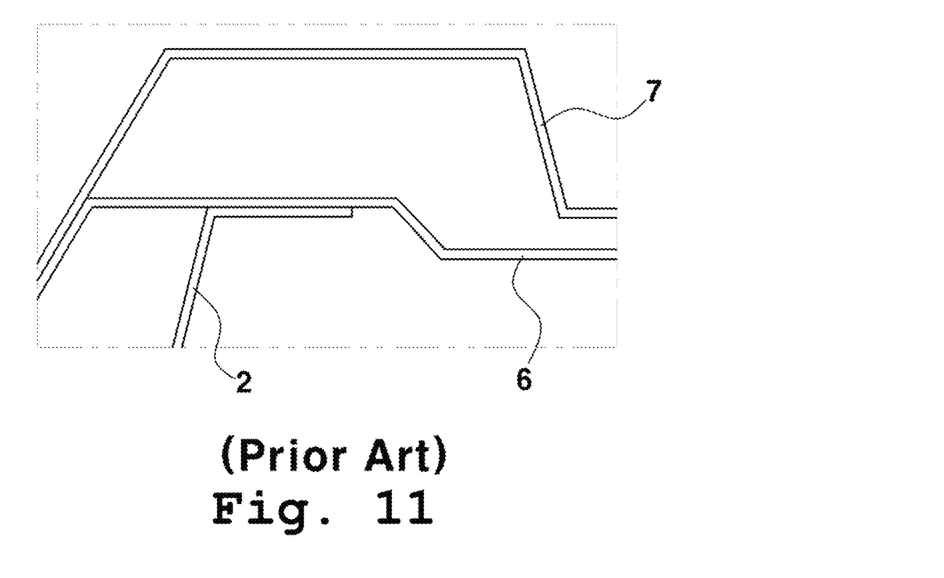
FIG. 11 is a cross-sectional view of FIG. 10 viewed at line D'-D'.
Figure 12:
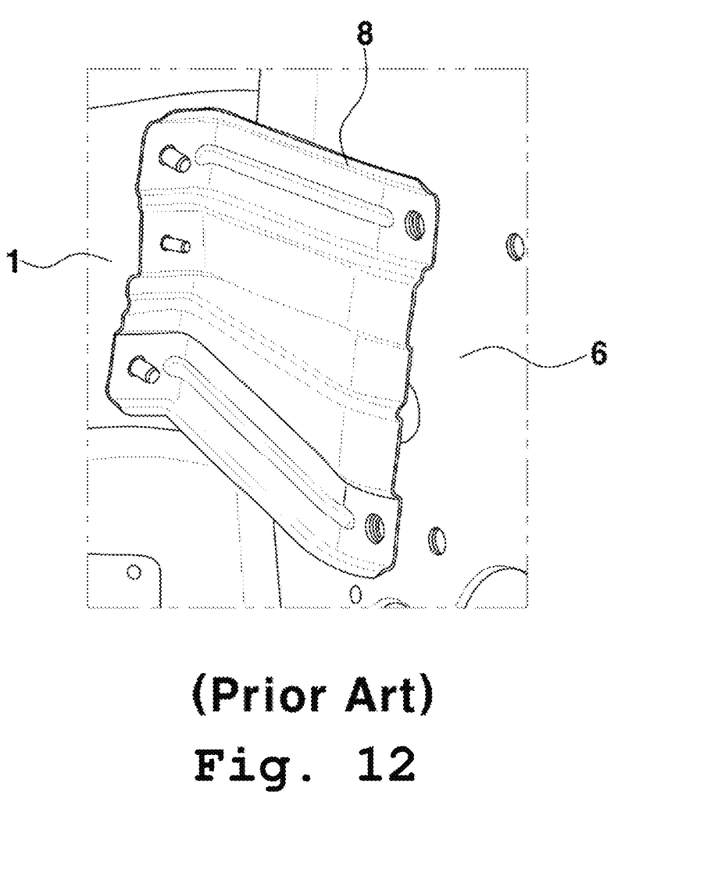
FIG. 12 is a view illustrating a cowl side bracket coupled to both a conventional cowl and a pillar inner panel.

FIG. 7 illustrates the structure of the front vehicle body to which a conventional cowl structure is applied, FIG. 8 is a cross-sectional view of FIG. 7 viewed at line A'-A', FIG. 9 is a broken perspective view illustrating the B' section of FIG. 7, FIG. 10 is a broken perspective view illustrating the C' section of FIG. 7 viewed at the inside of the vehicle body, FIG. 11 is a cross-sectional view of FIG. 10 viewed at line D'-D', and FIG. 12 is a view illustrating a cowl side bracket coupled to both a conventional cowl and a pillar inner panel. FIGS. 9 and 10 omit the cowl support bracket 4 and so on.

As illustrated in FIGS. 7 to 9, the conventional cowl is configured with a first cowl top panel 1, a second cowl top panel 2, a lower cowl panel 3, and a cowl support bracket 4.

The first cowl top panel 1 is formed in a bent structure so as to form a space portion whose lower surface is open, and a lower portion of windshield glass 5 is coupled to a front portion of the first cowl top panel.

The second cowl top panel 2 has an upper portion coupled by welding to a lower portion of the first cowl top panel, and a lower portion coupled by welding to a rear upper end of the lower cowl panel 3.

The lower cowl panel 3 is formed in a bent structure so as to form a space portion whose upper surface is open.

The cowl support bracket 4 is coupled to the first cowl top panel 1 and the lower cowl panel 3 and disposed in an upwardly inclined manner. At this time, the front portion of the cowl support bracket 4 is coupled to a lower surface portion of the lower cowl panel 3 and is disposed in the front lower side of the windshield glass 5, and the rear portion of the cowl support bracket 4 is coupled to the front portion of the first cowl top panel coupled to the lower portion of the windshield glass 5.

The cowl having the above-described structure supports a load of the windshield glass 5 by means of a coupling portion P4 of the second cowl top panel 2 and the lower cowl panel 3 and a coupling portion P5 of the cowl support bracket 4 and the lower cowl panel 3.

As the conventional cowl supports the load of the windshield glass 5 only by the two coupling portions P4 and P5, excessive moment acts on each of the coupling portions P4 and P5, causing excessive displacement of the windshield glass 5 to be generated and NVH performance to be degraded. In addition, degradation of the NVH performance of the cowl causes an increase in vibration of a steering column.

Further, structural rigidity of the cowl is degraded due to insufficiency of the coupling portions P4 and P5 supporting the load of the windshield glass 5 and excessive moment acting on the coupling portions P4 and P5. For these reasons, there is a growing need for any separate component for increasing the structural rigidity of the cowl.

Meanwhile, as illustrated in FIGS. 10 and 11, the transverse end of the second cowl top panel 2 of the conventional cowl is coupled by flange welding to the pillar inner panel 6. This cowl causes the structural rigidity of the vehicle body to be degraded because desired connectivity to the pillar inner panel 6 is not realized.

In order to increase the connectivity to the pillar inner panel 6, a separate cowl side bracket 8 to be coupled to both the first cowl top panel 1 and the pillar inner panel 6 is applied to the cowl as illustrated in FIG. 12. For reference, a member denoted by reference numeral 7 in FIG. 11 is a pillar reinforcement panel 7 for reinforcing the pillar inner panel 6.

In addition, when the cowl matches with the pillar inner panel 6, a gap is formed therebetween (refer to FIG. 10), causing such problems that sealability of the vehicle body is degraded and paint workability of the vehicle body is degraded.

SUMMARY

The present disclosure relates to a cowl structure of a vehicle. Particular embodiments relate to a vehicle cowl structure for improving NVH (noise, vibration, and harshness) performance and structural rigidity.

Accordingly, embodiments of the present disclosure have been made keeping in mind problems occurring in the related art, and an embodiment of the present disclosure provides a cowl structure of a vehicle directed to improving NVH performance and structural rigidity compared to the conventional cowl structure.

The present disclosure is not limited to the above-described embodiment, and other embodiments of the present disclosure not mentioned herein will be clearly understood by those of ordinary knowledge in the art on the basis of the following description.

According to an embodiment of the present disclosure, a cowl structure of a vehicle includes a first cowl top panel formed in a bent structure to provide a top space portion whose rear surface is open, and having an upper portion coupled to a lower portion of windshield glass, thereby supporting the lower portion of the windshield glass, and a second cowl top panel coupled to the first cowl top panel so as to close the rear surface of the top space portion.

According to an embodiment of the present disclosure, a rear portion of a cowl support bracket is coupled to a central portion of the first cowl top panel, and a front portion of the cowl support bracket is coupled to a lower surface portion of a lower cowl panel. A rear portion of the lower cowl panel is coupled to a lower portion of the second cowl top panel, and a lower surface portion of the lower cowl panel extends in front of the second cowl top panel.

The first cowl top panel includes an upper panel portion coupled to the lower portion of the windshield glass, a lower panel portion disposed in a lower side of the upper panel portion, and a central panel portion extending between a front end of the upper panel portion and a front end of the lower panel portion, wherein the top space portion is surrounded by the upper panel portion, the lower panel portion, and the central panel portion.

The lower portion of the second cowl top panel is stacked and disposed on a rear surface of the lower flange, and a rear portion of the lower cowl panel is stacked and disposed on a rear surface of the lower portion of the second cowl top panel.

The first cowl top panel includes a first upper flange extending from a rear end of the upper panel portion and being coupled to an upper portion of the second cowl top panel, and a lower flange extending from a rear end of the lower panel portion and being coupled to a lower portion of the second cowl top panel.

The cowl support bracket is disposed in an upwardly inclined manner. Specifically, the cowl support bracket is provided with a front flange coupled to the lower surface portion of the lower cowl panel in the front portion thereof, and a rear flange coupled to the central panel portion of the first cowl top panel in a rear portion thereof. The front flange is disposed on a front lower side of the rear flange.

The first cowl top panel is provided with a first side flange in a transverse end thereof, and the first side flange is coupled to a pillar inner panel provided in a lateral surface portion of a vehicle body.

The second cowl top panel is provided with a second side flange in a transverse end thereof, and the second side flange is coupled to both the pillar inner panel and the first side flange simultaneously.

The first side flange is stacked and disposed on the pillar inner panel, and the second side flange is stacked and disposed on the first side flange.

The first side flange is formed integrally with the first upper flange of the first cowl top panel, and a transverse end of the first upper flange is coupled to an inner flange of the pillar inner panel.

The second side flange is formed integrally with a second upper flange provided in the upper portion of the second cowl top panel, and the transverse end of the first upper flange is disposed between the inner flange and the second upper flange and coupled to the inner flange and the second upper flange simultaneously.

The inner flange is formed on a front edge of the pillar inner panel, and supports a transverse end of the windshield glass.

The transverse end of the first upper flange and a transverse end of the first cowl top panel including the side flange are configured to match with a longitudinal end of the pillar inner panel including the inner flange.

The cowl of embodiments of the present disclosure may obtain the following effects by the configuration, coupling, and use of embodiments as described above.

First, the cowl of embodiments of the present disclosure is configured in such a manner that a cowl top panel directly coupled to a lower portion of windshield glass forms a closed section, thereby increasing NVH performance and structural rigidity.

Second, the cowl of embodiments of the present disclosure is configured in such a manner that a load of the windshield glass can be more dispersed compared to the conventional cowl, thereby increasing the NVH performance.

Third, the cowl of embodiments of the present disclosure maximizes connectivity and a coupling property to a lateral surface portion (that is, a pillar inner panel) of the vehicle body, thereby increasing the structural rigidity of the vehicle body and reducing the number of components for the cowl.

Fourth, the cowl of embodiments of the present disclosure is configured in such a manner that the transverse end thereof is closely coupled to the pillar inner panel, eliminating the conventional gap therebetween, thereby increasing the sealability of the vehicle body and the paint workability of the vehicle body.

Embodiments of the present disclosure are not limited to the features described above, and other features of embodiments of the present disclosure not mentioned herein could be clearly understood by those skilled in the art on the basis of the following description.

BRIEF DESCRIPTION OF THE DRAWINGS

The above and other objectives, features, and other advantages of embodiments of the present disclosure will be more clearly understood from the following detailed description when taken conjointly with the accompanying drawings, in which.

DETAILED DESCRIPTION OF ILLUSTRATIVE EMBODIMENTS

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure.

Unless the context clearly indicates otherwise, it will be understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

In addition, unless otherwise described herein, the terms "front", "rear", "up", and "down", etc. are described on the basis of the vehicle. Also, the terms "longitudinal" or "lengthwise" used herein imply a direction extending forward and rearward on the basis of the vehicle, the term "height direction" implies a direction extending vertically on the basis of the vehicle, and the terms "transverse" or "widthwise" imply a direction extending horizontally on the basis of the vehicle.

Hereinafter, preferred embodiments of the present disclosure will be described in detail with reference to the accompanying drawings. Those represented in the attached drawings are illustrated in order to easily explain the embodiments of the present disclosure and they may thus be different from the configuration actually embodied.

Embodiments of the present disclosure are directed to a vehicle cowl structure supporting a lower portion of windshield glass, being configured to improve NVH performance and structural rigidity compared to the conventional cowl structure. In this regard, the cowl of embodiments of the present disclosure is configured to have a closed sectional structure in the lower side of the windshield glass.

The cowl of embodiments of the present disclosure is configured in such a manner that a load of the windshield glass can be more dispersed compared to the conventional cowl, thereby improving NVH performance. The cowl of embodiments of the present disclosure is configured to allow the load of the windshield glass to be dispersed in three directions, thereby improving booming noise and vibration of the steering column.

In addition, the cowl of embodiments of the present disclosure is configured so as to maximize connectivity and a coupling property to a lateral surface portion (that is, a pillar inner panel) of the vehicle body, according to which structural rigidity of the vehicle body is improved and the number of components for the cowl is reduced.

The cowl of embodiments of the present disclosure is also configured to couple the transverse end thereof closely to the pillar inner panel to eliminate the gap in the conventional cowl, according to which sealability of the vehicle body is enhanced and the paint workability of the vehicle body is improved.

Figure 1:
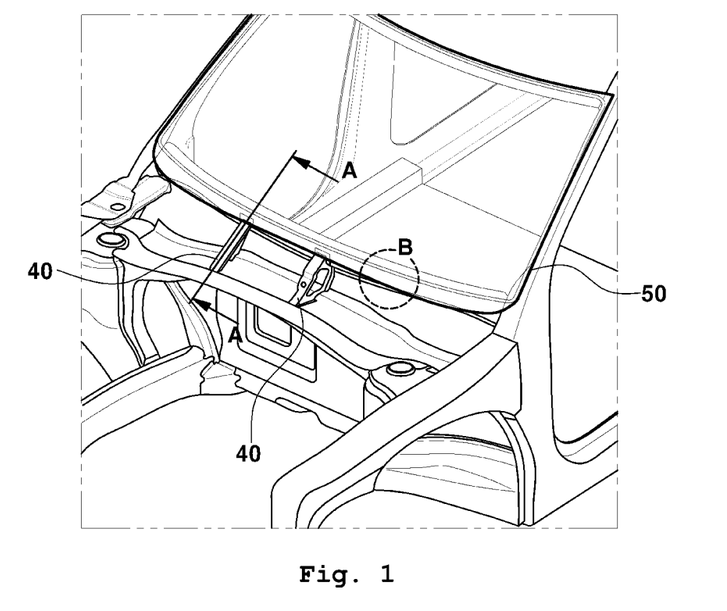
FIG. 1 is a perspective view illustrating a structure of the front vehicle body to which a cowl structure according to an embodiment of the present disclosure is applied.
Figure 2:
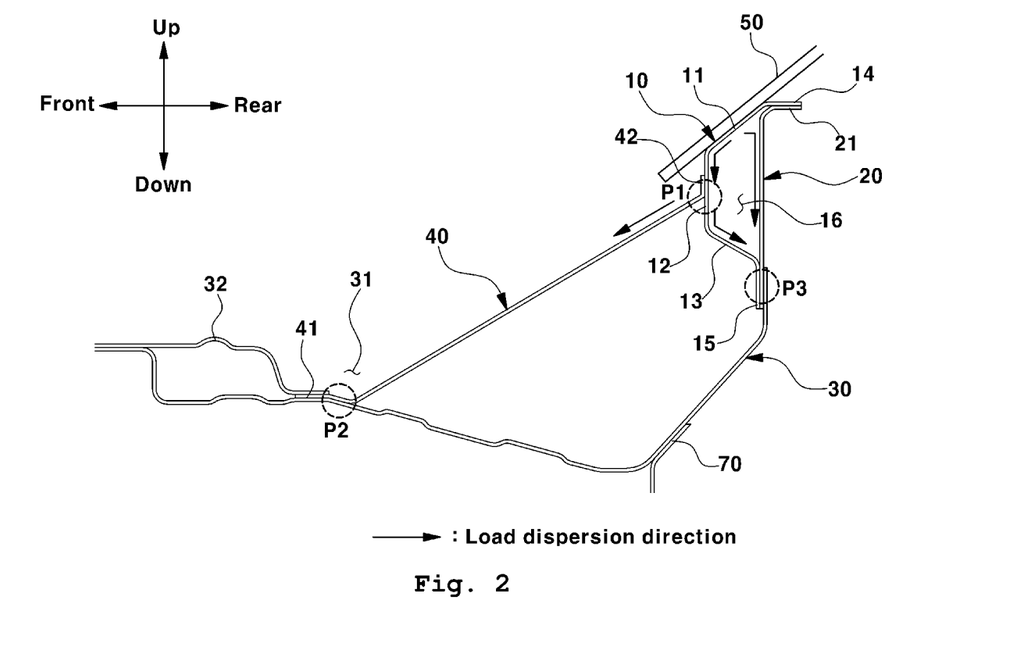
FIG. 2 is a cross-sectional view of FIG. 1 viewed at line A-A.
Figure 3:
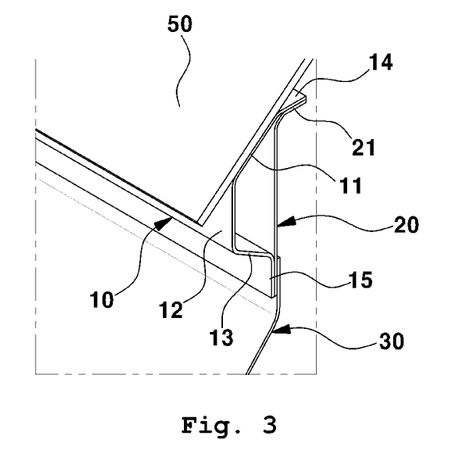
FIG. 3 is a broken perspective view illustrating the B section of FIG. 1.
Figure 4:
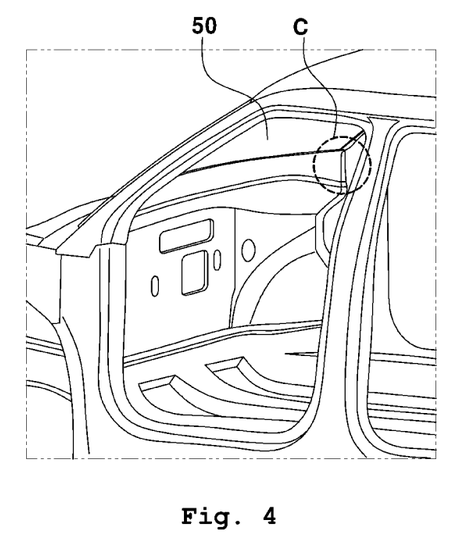
FIG. 4 illustrates the structure of the front vehicle body to which a cowl structure according to an embodiment of the present disclosure is applied, viewed at the inside of the vehicle body.
Figure 5:
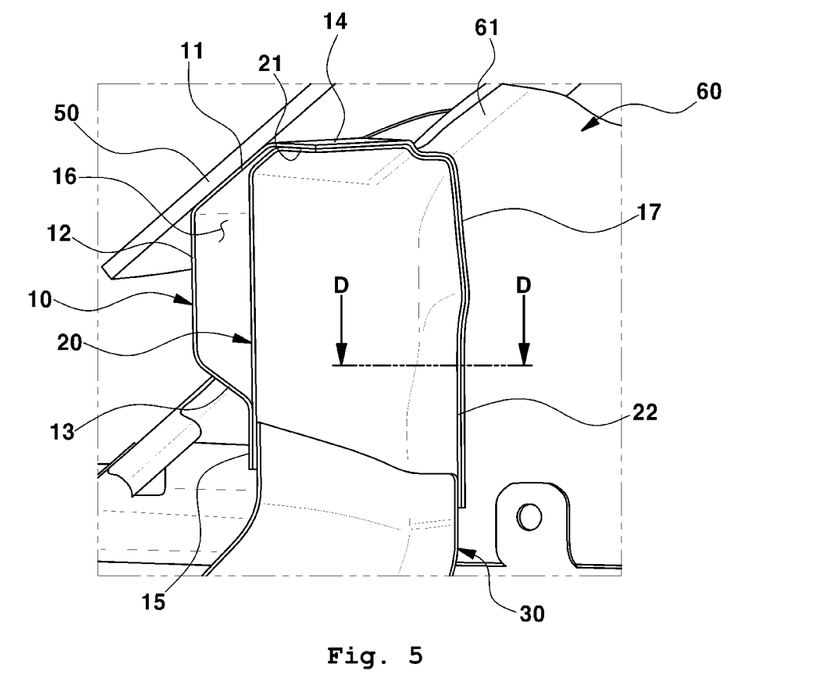
FIG. 5 is a broken perspective view illustrating the C section of FIG. 4.
Figure 6:
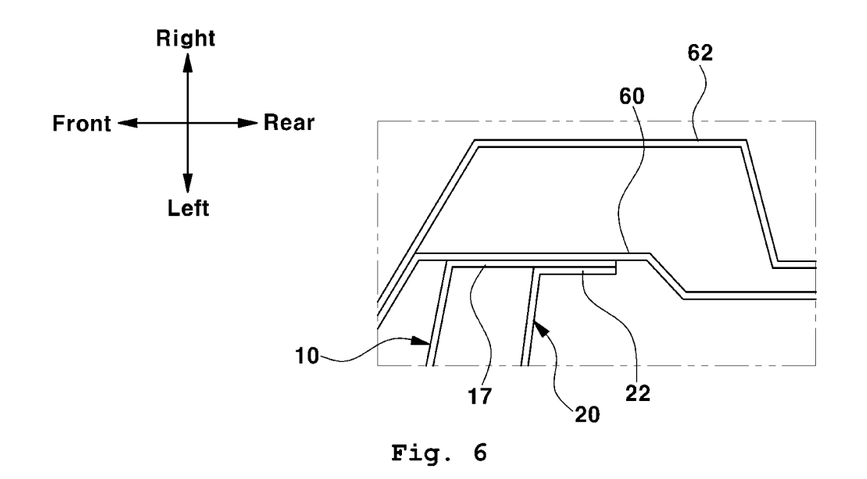
FIG. 6 is a cross-sectional view of FIG. 5 viewed at line D-D.

FIG. 1 is a perspective view illustrating a structure of the front vehicle body to which a cowl structure according to an embodiment of the present disclosure is applied, FIG. 2 is a cross-sectional view of FIG. 1 viewed at line A-A, FIG. 3 is a broken perspective view illustrating the B section of FIG. 1, FIG. 4 illustrates the structure of the front vehicle body to which a cowl structure according to an embodiment of the present disclosure is applied, viewed at the inside of the vehicle body, FIG. 5 is a broken perspective view illustrating the C section of FIG. 4, and FIG. 6 is a cross-sectional view of FIG. 5 viewed at line D-D. FIGS. 3 and 5 omit the cowl support bracket 40 and so on.

As illustrated in FIGS. 1 to 3, the cowl according to an embodiment of the present disclosure is configured to be disposed on a lower side of the windshield glass 50 so as to support the lower portion of the windshield glass 50. The cowl is configured to include a first cowl top panel 10 and a second cowl top panel 20. The windshield glass 50 is disposed at an incline in the front portion of the vehicle body.

The first cowl top panel 10 has an upper portion (that is, an upper panel portion) coupled to the lower portion of the windshield glass 50. The upper portion of the first cowl top panel 10 is coupled to the lower portion of the windshield glass 50 by means of an adhesive.

The first cowl top panel 10 is formed in a bent structure so as to provide a top space portion 16 whose rear surface is open. Specifically, the first cowl top panel 10 is configured to include an upper panel portion 11 provided in the upper portion thereof, a lower panel portion 13 provided in the lower portion thereof, and a central panel portion 12 provided in the center thereof. The top space portion 16 is a space portion surrounded by the upper panel portion 11, the lower panel portion 13, and the central panel portion 12.

The upper panel portion 11 is disposed in the lower side of the windshield glass 50 in an upwardly inclined manner and is coupled to the lower portion of the windshield glass 50. The lower panel portion 13 is disposed in the lower side of the upper panel portion 11 in a downwardly inclined manner.

The central panel portion 12 extends between the upper panel portion 11 and the lower panel portion 13. The central panel portion is integrally formed in the front end of the upper panel portion 11 and the front end of the lower panel portion 13. The central panel portion 12 extends between the front end of the upper panel portion 11 and the front end of the lower panel portion 13 in a height direction.

To describe in more detail, the upper panel portion 11 is formed in a bent structure rearward from the upper end of the central panel portion 12, and the lower panel portion 13 is formed in a bent structure rearward from the lower end of the central panel portion 12. In addition, the upper panel portion 11 supports the lower portion of the windshield glass 50 in a surface contact state with the lower portion of the windshield glass 50. The upper panel portion 11 is in direct surface contact with the lower surface of the lower portion of the windshield glass 50.

An upper flange 14 extends from the rear end of the upper panel portion 11, and a lower flange 15 extends from the rear end of the lower panel portion 13. The upper flange 14 extends rearward from the rear end of the upper panel portion 11, and the lower flange 15 extends downward from the rear end of the lower panel portion 13. The upper flange 14 is coupled to the bent upper portion (that is, the upper flange) of the second cowl top panel 20 by welding, and the lower flange 15 is coupled to the lower portion of the second cowl top panel 20 by welding.

The second cowl top panel 20 is formed in a plate-shaped structure, extending in the height direction of the vehicle. Specifically, the second cowl top panel 20 is formed in a plate-shaped structure in which the upper portion thereof is bent rearward. That is, the second cowl top panel 20 is formed in the plate-shaped structure, in which the upper flange 21 is provided in the upper portion thereof.

By way of example, the upper flange 21 of the second cowl top panel 20 may be bent so that the upper flange 21 forms a right angle in the central portion of the second cowl top panel 20. The upper portion of the second cowl top panel 20 extends in a lower end of the central portion of the second cowl top panel 20.

The second cowl top panel 20 is coupled to the first cowl top panel 10 so as to close the top space portion 16 of the first cowl top panel 10. Specifically, the second cowl top panel 20 is coupled to the upper flange 14 and the lower flange 15 of the first cowl top panel 10 so as to close the rear surface of the top space portion 16.

At this time, the upper flange 14 of the first cowl top panel 10 is coupled to the upper flange 21 of the second cowl top panel 20 by welding, and the lower flange 15 is coupled to the lower portion of the second cowl top panel 20 by welding.

Accordingly, the second cowl top panel 20 constitutes a closed section together with the first cowl top panel 10 in the lower side of the windshield glass 50.

Hereinbelow, the upper flange 14 of the first cowl top panel will be referred to as the first upper flange 14, and the upper flange 21 of the second cowl top panel 20 will referred to as the second upper flange 21.

The cowl top panels 10 and 20 are supported by the lower cowl panel 30 and a plurality of cowl support brackets 40.

The lower cowl panel 30 is formed in a bent structure so as to form a lower space portion 31 whose upper surface is open. At this time, the lower cowl panel 30 has a rear portion coupled to the lower portion of the second cowl top panel 20 by welding, and a lower surface portion extending from the lower end of the rear portion to the front of the second cowl top panel 20.

Specifically, the rear upper end of the lower cowl panel 30 is coupled to the lower portion of the second cowl top panel 20 coupled to the lower flange 15 of the first cowl top panel 10. That is, the rear upper end of the lower cowl panel 30 is coupled to the lower portion of the second cowl top panel 20 and the lower flange 15 of the first cowl top panel 10 simultaneously.

At this time, the lower portion of the second cowl top panel 20 is stacked and disposed on the rear surface of the lower flange 15, and the rear upper end of the lower cowl panel 30 is stacked and disposed on the rear surface of the lower portion of the second cowl top panel 20.

The lower cowl panel 30 is coupled to and supported by the floor panel of the vehicle body through the dash panel (refer to reference numeral 70 of FIG. 2). In addition, the lower cowl panel 30 is coupled to a cowl reinforcement panel 32 by welding in the front portion thereof.

Meanwhile, a rear portion (that is, the rear flange) of the cowl support bracket 40 is coupled to the central panel portion 12 of the first cowl top panel 10 by welding.

The cowl support bracket 40 is a plate-shaped member having a front flange 41 and a rear flange 42. The front flange 41 is provided in the front portion of the cowl support bracket 40 and is coupled to the lower surface portion of the lower cowl panel 30 by welding. The rear flange 42 is provided in the rear portion of the cowl support bracket 40 and is coupled to the central panel portion 12 by welding.

Specifically, the front flange 41 is stacked on and coupled to the front surface of the central panel portion 12, and the rear flange 42 is stacked on and coupled to the upper surface of the lower surface portion of the lower cowl panel 30. At this time, the front flange 41 is coupled to the central portion of the lower surface portion of the lower cowl panel 30 and disposed on the front lower side of the rear flange 42. That is, the cowl support bracket 40 is coupled to the lower surface portion of the lower cowl panel 30 and the central panel portion 12 of the first cowl top panel and disposed in an upwardly inclined manner.

The cowl support bracket 40 forms a second closed section together with the first cowl top panel 10 and the lower cowl panel 30. The second closed section is disposed in the first closed section of the cowl top panels 10 and 20, that is, in the lower side of the first closed section surrounding the top space portion 16. The first closed section and the second closed section are divided on the basis of the central panel portion 12 and the lower panel portion 13 of the first cowl top panel 10.

Also, as shown in FIG. 2, a flange of the cowl reinforcement panel 32 is stacked on and coupled to the upper surface of the front flange 41. The front flange 41 may be stacked on and coupled to the flange upper surface of the cowl reinforcement panel 32 although it is not illustrated in the drawings. At this time, the flange of the cowl reinforcement panel 32 may be stacked on and coupled to the upper surface of the lower surface portion of the lower cowl panel 30.

The load of the windshield glass 50 acting on the cowl having the above-described structure is dispersed in three directions. The load of the windshield glass 50 is dispersed and applied to three points of the cowl through the upper panel portion 11 of the first cowl top panel 10.

Referring to FIG. 2, the load of the windshield glass 50 is dispersed and acts on a first support point P1, a second support point P2, and a third support point P3. The first support point P1 is a site at which the central panel portion 12 of the first cowl top panel 10 and the rear flange 42 of the cowl support bracket are coupled to each other. The second support point P2 is a site at which the front flange 41 of the cowl support bracket 40 and the lower surface portion of the lower cowl panel 30 are coupled to each other. The third support point P3 is a site at which the lower flange 15 of the first cowl top panel 10, the lower portion of the second cowl top panel 20, and the rear upper end of the lower cowl panel 30 are coupled simultaneously.

The load of the windshield glass 50 is transmitted first to the upper panel portion 11 of the first cowl top panel 10. The load of the windshield glass 50 transmitted to the upper panel portion 11 is dispersed to the central panel portion 12 of the first cowl top panel 10 and the lower portion of the second cowl top panel 20. At this time, the load dispersed to the central panel portion 12, that is, the load dispersed to the first support point P1, is dispersed to the second support point P2 and the third support point P3.

Due to the cowl of embodiments of the present disclosure as described above, the load of the windshield glass 50 is more dispersed compared to the conventional cowl, reducing the moment taken at each of the support points P1 to P3 and causing the displacement of the windshield glass 50 to be reduced, thereby improving NVH performance of the cowl. In addition, the cowl of embodiments of the present disclosure increases the structural rigidity due to the closed sectional structure of the cowl top panels 10 and 22, compared to the conventional cowl.

The cowl top panels 10 and 20 connect the transverse ends thereof to each of the lateral surface portions of the vehicle body. The pillar inner panels 60 are provided in the lateral surface portions of the vehicle body.

Referring to FIGS. 4 to 6, the first cowl top panel 10 is provided with a first side flange 17 in the transverse end thereof. The first side flange 17 is coupled to the pillar inner panel 60 by welding. At this time, the first side flange 17 is directly coupled to the pillar inner panel 60, and is stacked and disposed on the inner side surface of the pillar inner panel 60.

In addition, the second cowl top panel 20 is provided with a second side flange 22 in the transverse end thereof. The second side flange 22 is coupled to the pillar inner panel 60 and the first side flange 17 simultaneously. At this time, the second side flange 22 is directly coupled to the first side flange 17, and is stacked and disposed on the inner side surface of the first side flange 17.

The first side flange 17 is disposed between the pillar inner panel 60 and the second side flange 22, and is coupled to the second side flange 22 and the pillar inner panel 60 by welding.

In addition, the front portion of the first side flange 17 is solely coupled to the pillar inner panel 60, and the rear portion of the first side flange 17 is coupled to the pillar inner panel 60 together with the second side flange 22. The second side flange 22 is stacked and disposed on the rear portion of the first side flange 17.

Further, the first side flange 17 is formed integrally with the first upper flange 14 of the first cowl top panel 10, constituting a bent structure. The second side flange 22 is formed integrally with the second upper flange 21 of the second cowl top panel 20, constituting a bent structure.

As seen in FIG. 5, the transverse end of the first upper flange 14 is coupled to an inner flange 61 of the pillar inner panel 60 by welding. The first upper flange 14 is disposed under the inner flange 61 and is stacked and disposed on the second upper flange 21.

That is, the transverse end of the first upper flange 14 is disposed between the inner flange 61 and the second upper flange 21 and is coupled to the inner flange 61 and the second upper flange 21 simultaneously.

The inner flange 61 is formed in a bent shape in the front edge of the pillar inner panel 60, supporting the transverse end of the windshield glass 50.

The transverse end of the first upper flange 14 and the first side flange 17 are also configured to match with the bent structure of the pillar inner panel 60 including the inner flange 61. That is, the transverse end of the first upper flange 14 and the transverse end of the first cowl top panel 10 including the first side flange 17 are configured to match with the bent structure of the pillar inner panel 60 including the inner flange 61.

According to this configuration, when the transverse end of the first upper flange 14 is coupled to a lower surface of the inner flange 61 and the first side flange 17 is coupled to an inner side surface of the pillar inner panel 60, no gap is formed between the first cowl top panel 10 and the pillar inner panel 60.

That is, the first cowl top panel 10 is directly and closely coupled to the longitudinal end of the pillar inner panel 60 including the inner flange 61.

FIGS. 5 and 6 illustrate the right side structure of the cowl top panels 10 and 20. In this regard, the left side structure of the cowl top panels 10 and 20 is also configured in the same manner as the right side structure of the cowl top panels 10 and 20. By way of example, the right side structure and the left side structure of the cowl top panels 10 and 20 may be configured to be symmetrical to each other.

The reference numeral 62 in FIG. 6 denotes a pillar reinforcement panel 62 coupled to an outer side surface of the pillar inner panel 60 by welding.

In the cowl of embodiments of the present disclosure, the transverse ends of the cowl top panels 10 and 20 are coupled to the pillar inner panel 60 as illustrated in FIGS. 5 and 6, thereby increasing the coupling property to the pillar inner panel 60. Accordingly, the structural rigidity of the vehicle body is enhanced compared to the conventional cowl, and it is possible to eliminate the conventional cowl side bracket (refer to reference numeral 8 of FIG. 12).

Referring to FIG. 12, the cowl side bracket 8 is coupled to both the conventional first cowl top panel 1 and the pillar inner panel 6, serving to enhance connectivity between the cowl and the pillar inner panel 6.

In addition, the first upper flange 14 and the first side flange 17 of the first cowl top panel 10 are closely coupled to the pillar inner panel 60 without gap, thereby increasing the sealability of the vehicle body, which serves to improve the paint workability of the vehicle body.

Although the present disclosure has been described with reference to specific embodiments shown in the drawings, it is apparent to those skilled in the art that the present invention may be changed and modified in various ways without departing from the scope of the present disclosure, which is described in the following claims.

What is claimed is:

1. A cowl structure of a vehicle, the cowl structure comprising:
a first cowl top panel formed in a bent structure to define a top space portion having an open rear surface, an upper portion of the first cowl top panel being coupled to and supporting a lower portion of a windshield glass;
a second cowl top panel coupled to the first cowl top panel and closing the open rear surface of the top space portion; and
a cowl support bracket, wherein a rear portion of the cowl support bracket is coupled to a central portion of the first cowl top panel.

2. The cowl structure of claim 1 wherein a front portion of the cowl support bracket is coupled to a lower surface portion of a lower cowl panel.

3. The cowl structure of claim 2, wherein a rear portion of the lower cowl panel is coupled to a lower portion of the second cowl top panel, and the lower surface portion of the lower cowl panel extends in front of the second cowl top panel.

4. The cowl structure of claim 2, wherein the cowl support bracket is disposed in an upwardly inclined manner.

5. The cowl structure of claim 4, wherein:
the cowl support bracket comprises a front flange coupled to the lower surface portion of the lower cowl panel in the front portion thereof, and a rear flange coupled to the central portion of the first cowl top panel in a rear portion thereof; and
the front flange is disposed on a front lower side of the rear flange.

6. The cowl structure of claim 1, wherein the first cowl top panel comprises:
an upper panel portion coupled to the lower portion of the windshield glass;
a lower panel portion disposed in a lower side of the upper panel portion; and
a central panel portion extending between a front end of the upper panel portion and a front end of the lower panel portion, wherein the top space portion is surrounded by the upper panel portion, the lower panel portion, and the central panel portion.

7. The cowl structure of claim 6, wherein the first cowl top panel comprises:
a first upper flange extending from a rear end of the upper panel portion and being coupled to an upper portion of the second cowl top panel; and
a lower flange extending from a rear end of the lower panel portion and being coupled to a lower portion of the second cowl top panel.

8. The cowl structure of claim 7, wherein the lower portion of the second cowl top panel is stacked and disposed on a rear surface of the lower flange, and a rear portion of a lower cowl panel is disposed and stacked on a rear surface of the lower portion of the second cowl top panel.

9. A cowl structure of a vehicle, the cowl structure comprising:
a first cowl top panel formed in a bent structure to define a top space portion having an open rear surface, an upper portion of the first cowl top panel being coupled to and supporting a lower portion of a windshield glass, the first cowl top panel comprising a first side flange in a transverse end thereof, wherein the first side flange is coupled to a pillar inner panel provided in a lateral surface portion of a vehicle body;

a second cowl top panel coupled to the first cowl top panel and closing the open rear surface of the top space portion; and a cowl support bracket disposed in an upwardly inclined manner, a rear portion of the cowl support bracket being coupled to a central portion of the first cowl top panel, and a front portion of the cowl support bracket being coupled to a lower surface portion of a lower cowl panel, the cowl support bracket comprising a front flange coupled to the lower surface portion of the lower cowl panel in the front portion thereof, and a rear flange coupled to the central portion of the first cowl top panel in a rear portion thereof, wherein the front flange is disposed on a front lower side of the rear flange.

10. The cowl structure of claim 9, wherein the second cowl top panel comprises a second side flange in a transverse end thereof, and the second side flange is coupled to both the pillar inner panel and the first side flange simultaneously.

11. The cowl structure of claim 10, wherein the first side flange is stacked and disclosed on the pillar inner panel, and the second side flange is stacked and disposed on the first side flange.

12. The cowl structure of claim 10, wherein the first side flange is formed integrally with a first upper flange of the first cowl top panel, and a transverse end of the first upper flange is coupled to an inner flange of the pillar inner panel.

13. The cowl structure of claim 12, wherein the second side flange is formed integrally with a second upper flange provided in the upper portion of the second cowl top panel, and the transverse end of the first upper flange is disposed between the inner flange and the second upper flange and coupled to the inner flange and the second upper flange simultaneously.

14. The cowl structure of claim 12, wherein the inner flange is formed on a front edge of the pillar inner panel, and supports a transverse end of the windshield glass.

15. The cowl structure of claim 12, wherein the transverse end of the first upper flange and a transverse end of the first cowl top panel comprising the first side flange are configured to match with a longitudinal end of the pillar inner panel comprising the inner flange.

16. A vehicle comprising:
a vehicle body;
a windshield glass disposed at a front end of the vehicle body;
a pillar inner panel provided in a lateral surface portion of the vehicle body;
a lower cowl panel;
a first cowl top panel having a bent structure to define a top space portion having an open rear surface, an upper portion of the first cowl top panel being coupled to and supporting a lower portion of the windshield glass;

a second cowl top panel coupled to the first cowl top panel and closing the open rear surface of the top space portion; and a cowl support bracket, wherein a rear portion of the cowl support bracket is coupled to a central portion of the first cowl top panel, and a front portion of the cowl support bracket is coupled to a lower surface portion of the lower cowl panel.

17. The vehicle of claim 16, wherein the cowl support bracket is disposed in an upwardly inclined manner.

18. The vehicle of claim 16, wherein:
the cowl support bracket comprises a front flange coupled to the lower surface portion of the lower cowl panel in the front portion thereof, and a rear flange coupled to the central portion of the first cowl top panel in a rear portion thereof; and
the front flange is disposed on a front lower side of the rear flange.

19. The vehicle of claim 16, wherein the first cowl top panel comprises:
an upper panel portion coupled to the lower portion of the windshield glass;
a lower panel portion disposed in a lower side of the upper panel portion;
a central panel portion extending between a front end of the upper panel portion and a front end of the lower panel portion, wherein the top space portion is surrounded by the upper panel portion, the lower panel portion, and the central panel portion;
a first upper flange extending from a rear end of the upper panel portion and being coupled to an upper portion of the second cowl top panel; and
a lower flange extending from a rear end of the lower panel portion and being coupled to a lower portion of the second cowl top panel.

20. The vehicle of claim 19, wherein the lower portion of the second cowl top panel is stacked and disposed on a rear surface of the lower flange, and a rear portion of the lower cowl panel is disposed and stacked on a rear surface of the lower portion of the second cowl top panel.

21. A cowl structure of a vehicle, the cowl structure comprising:
a first cowl top panel formed in a bent structure to define a top space portion having an open rear surface, an upper portion of the first cowl top panel being coupled to and supporting a lower portion of a windshield glass;
a second cowl top panel coupled to the first cowl top panel and closing the open rear surface of the top space portion; and
a lower cowl panel provided formed in a bent structure to form a lower space portion with an upper surface that is open and having a rear portion coupled to a lower portion of the second cowl top panel, wherein a lower flange of the first cowl top panel, the lower portion of the second cowl top panel and the rear portion of the lower cowl panel are coupled together.

* * * * *